United States Patent [19]

Brown

[11] Patent Number: 5,707,202

[45] Date of Patent: Jan. 13, 1998

[54] MATERIAL HANDLING MACHINE

[75] Inventor: David J. B. Brown, North Yorkshire, United Kingdom

[73] Assignee: Caterpillar Inc., Peoria, Ill.

[21] Appl. No.: 553,599

[22] PCT Filed: May 10, 1995

[86] PCT No.: PCT/US95/05912

§ 371 Date: Dec. 6, 1995

§ 102(e) Date: Dec. 6, 1995

[87] PCT Pub. No.: WO95/31615

PCT Pub. Date: Nov. 23, 1995

[30] Foreign Application Priority Data

May 16, 1994 [GB] United Kingdom .................. 9409782

[51] Int. Cl.⁶ ............................................. E02F 9/02
[52] U.S. Cl. ................................. 414/685; 180/292
[58] Field of Search .......................... 414/680, 685; 180/292, 68.5

[56] References Cited

U.S. PATENT DOCUMENTS 3,235,021  2/1966  Hill ................................. 180/44
3,821,997  7/1974  Sieren ............................. 180/68.5
5,478,192  12/1995  Bentivoglio ..................... 414/718

FOREIGN PATENT DOCUMENTS

| 0 577 388 | 1/1994 | European Pat. Off. . |
| 2 204 158 | 5/1974 | France . |
| 22 35 726 | 1/1974 | Germany . |
| 2161784 | 1/1986 | United Kingdom .................. 414/680 |
| 2 268155 | 1/1994 | United Kingdom . |
| 2 291 384 | 1/1996 | United Kingdom . |

*Primary Examiner*—Donald W. Underwood
*Attorney, Agent, or Firm*—Claude F. White; Diana L. Charlton

[57] ABSTRACT

The machine has a chassis comprising a rigid longitudinal frame (1) whose width is less than 25% of the overall width of the machine, excluding the wheels. A boom is pivotally mounted on the chassis. A drive arrangement (7) comprises a mechanically driven transmission (37, 39, 41) kinematically connected to an engine (34). Shafts (43, 44) kinematically connect a power output (42) mid-way along the drive arrangement (7) to final drive units on the front and rear axles. The drive arrangement is mounted at one side of the longitudinal frame (1) between the axles. The rotary axis (51) of the engine shaft lies in a vertical plane which is inclined relative to the vertical longitudinal median plane (2) of the frame (1) so that its output end is nearer to the frame (1).

14 Claims, 3 Drawing Sheets

MATERIAL HANDLING MACHINE

TECHNICAL FIELD

This invention relates generally to machines for handling materials, and more particularly to machines which can be used for loading or digging.

BACKGROUND ART

In material handling machines in which both the front and rear wheels are driven, an engine mounted at an arbitrary position on the chassis usually drives a hydraulic pump which supplies a hydraulic circuit feeding hydraulic motor associated with the wheels. Such a hydraulic transmission is very inefficient compared with a mechanical transmission. Some of these prior art machines have a telescopic lifting arm pivotally mounted between an operator's cab and a longitudinally extending engine (i.e. the rotary axis of the engine shaft is parallel to the longitudinal axis of the machine).

Still other prior art material handling machines include a drive arrangement mounted on a chassis, at one side of a longitudinal chassis frame, between front and rear axles, with the drive arrangement including a longitudinally extending engine and a mechanically driven transmission, kinematically connected to the engine shaft and having a power output substantially mid-way along the drive arrangement. Drive shafts kinematically connect the power output to final drive units on the front and rear axles.

It would be desirable to be able to provide a drive arrangement which could improve the accessibility and layout of components and accessories while maintaining a constant velocity drive line.

The present invention is directed to overcoming one or more of the problems as set forth above.

DISCLOSURE OF THE INVENTION

The present invention provides a machine in which the engine is inclined with respect to the fore-and-aft direction. In particular, the rotary axis of the engine shaft lies in a vertical plane which is inclined relative to the vertical longitudinal median plane of the longitudinal frame so that the end of the engine shaft which is connected to the transmission is nearer to the longitudinal frame than is the other end.

The power output can be arranged to be directly below the longitudinal frame and substantially mid-way between the front and rear axles. These features optimize the arrangement of the shafts connecting the power output to the final drive units.

The longitudinal frame may have a width which is less than 25% (preferably at most 22.5%, possibly as little as 20% or less) of the overall width of the machine excluding the wheels. The narrow longitudinal frame maximizes the lateral space available for the engine. It also minimizes the distance between the center of gravity of the engine and the center-line of the machine.

The invention will be described further, by way of example only, with reference to the accompanying drawings.

BEST MODE FOR CARRYING OUT THE INVENTION

Figure 1:
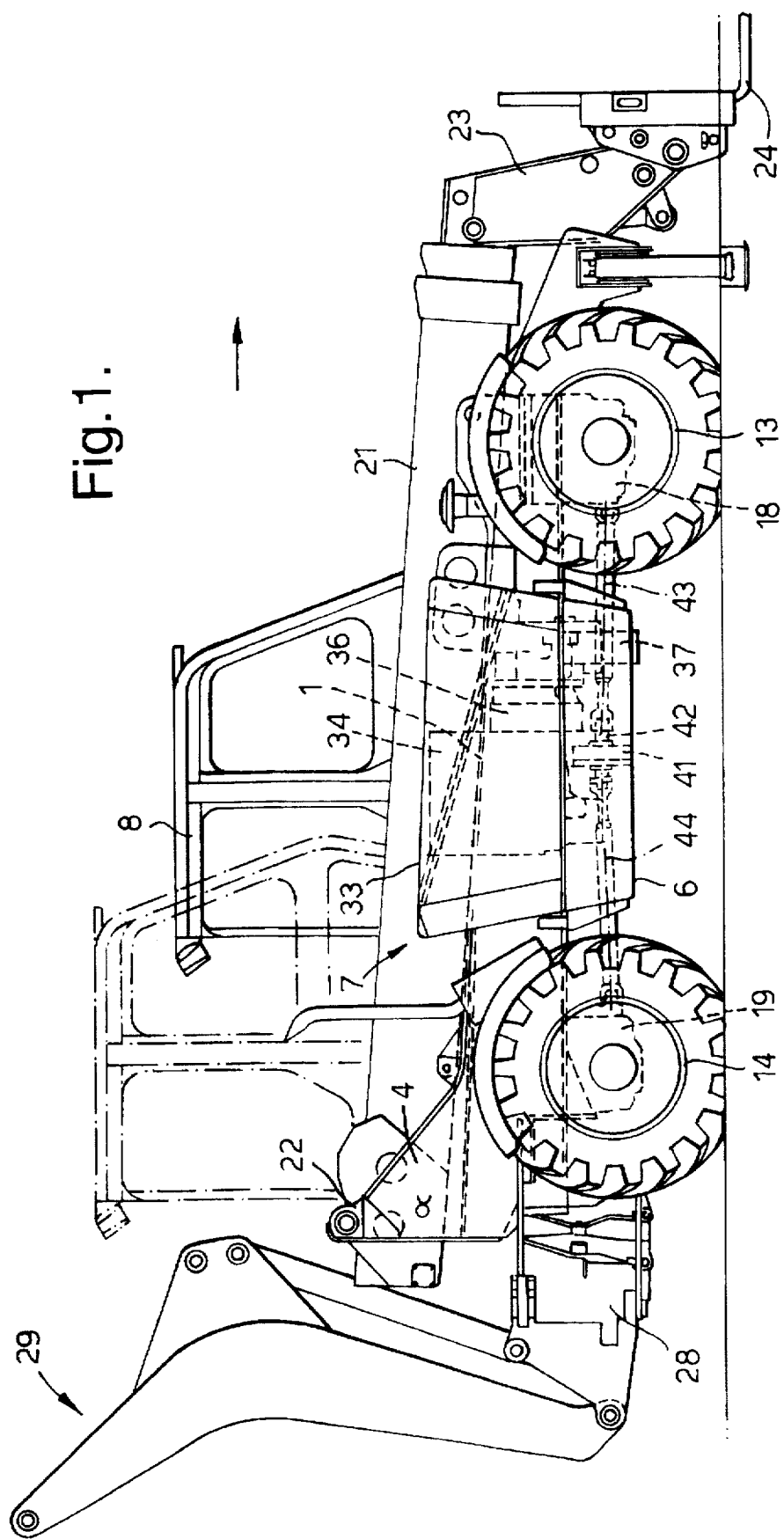
FIG. 1 is a diagrammatic side elevation view of a material handling machine.

With reference to the drawings, the machine illustrated can be used as a telescopic material handler (for pallet lifting), a loader (for loading), and a backhoe (for digging). It has a chassis comprising a rigid longitudinal frame 1 extending along the whole of the length of the body of the machine. The frame 1 is of substantially constant width and its vertical longitudinal median plane 2 is the same as that of the machine. A rigid transverse frame 6, extending across the whole width of the machine body, is mounted underneath the longitudinal frame 1 and supports a drive (engine/transmission) arrangement 7 on one side and an operator's cab 8 on the other side. An alternative cab position is shown in chain-dotted line in FIG. 1. The width of the longitudinal frame 1 is about 22.5% of the overall transverse width of the transverse frame 6.

Front and rear axles are mounted on the frame 1 and carry wheels 13, 14 of equal size, steered by means of hydraulic piston-and-cylinder devices (not shown). The front and rear wheels 13, 14 are drivable via final drive units 18, 19 on the axles.

A telescopic boom 21, having three sections, is pivotally mounted on brackets 22 fixed to the rear position 4 of the chassis frame 1. The extremity 23 of the boom 21 is fitted with pallet lifting forks 24 or a loader bucket or some other handling device. The center-line of the boom 21 lies in the vertical median plane 2 and it is pivotable by means of a hydraulic piston-and-cylinder device (not shown), connected between the chassis frame 1 and the first section of the boom 21. The rear of the chassis frame 1 carries a frame 28 for mounting a backhoe device 29.

The side-mounted drive arrangement 7, which is enclosed by a cover 33 that does not obstruct the operator's view to the front and rear, comprises an engine 34 connected by means of a torque converter 36 to a gearbox (dropbox) 37. The input of the gearbox is in line with the engine crankshaft. The gearbox output (which is at a lower level) is connected by means of a Cardan shaft 39 to a transfer box 41 mid-way along the engine/transmission arrangement 7 and mid-way between the axles.

The power take-off or output (axis 42) of the transfer box 41 lies beneath the longitudinal frame 1 and close to the vertical median plane 2. The power take-off is connected by means of respective Cardan shafts (axes 43, 44) to the final drive units.

Figure 3:
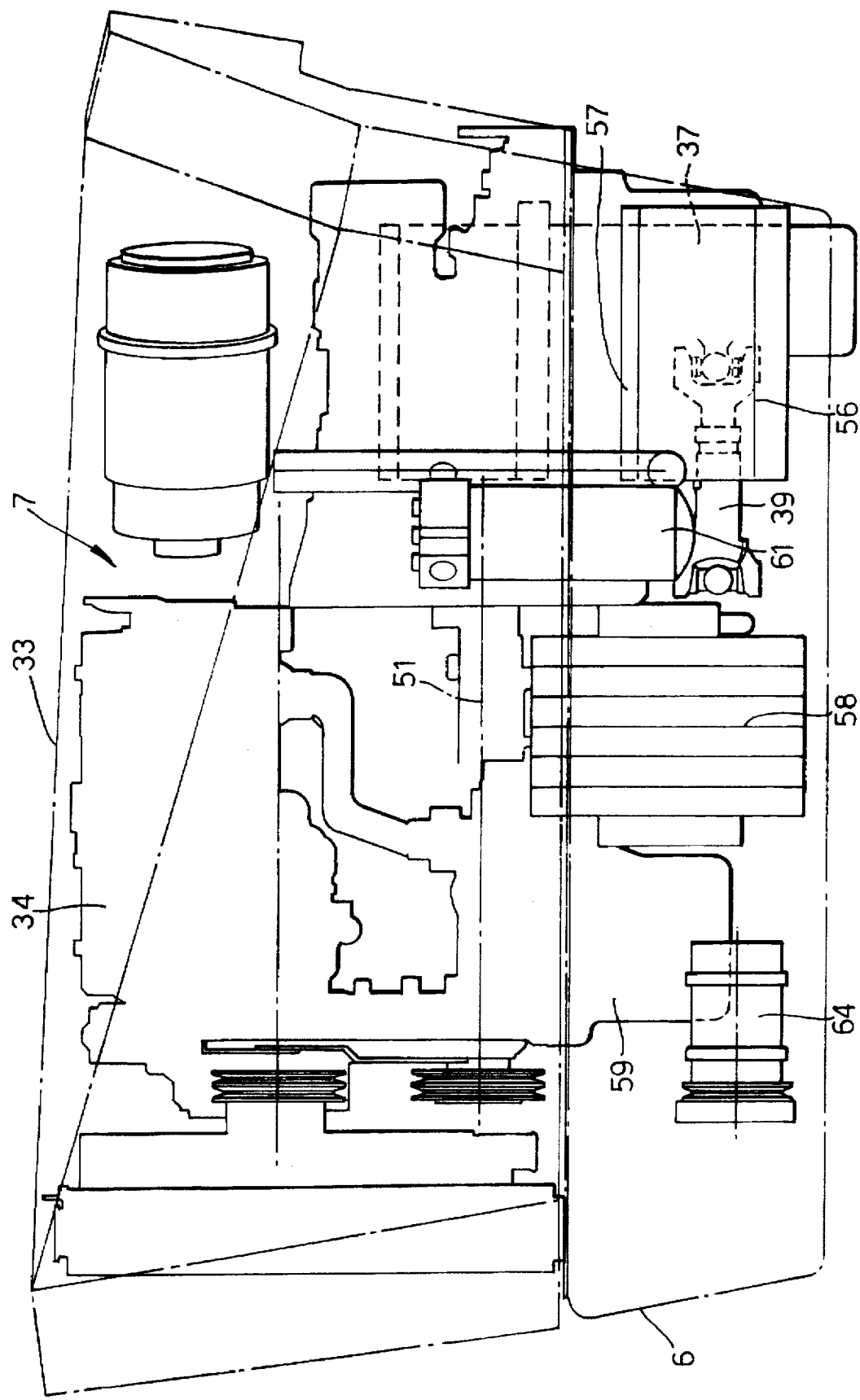
FIG. 3 is a diagrammatic view in the direction of arrow A in FIG. 2, showing the engine compartment.

The crankshaft axis 51 of the engine 34 extends horizontally and lies in a vertical plane (the plane of FIG. 3) which is inclined at an angle of about 7° relative to the vertical median plane 2. Thus the end of the engine shaft which is connected to the torque converter 36 is nearer to the longitudinal chassis frame 1 than is the other end, so that the gearbox 37 lies close to the frame 1.

Figure 2:
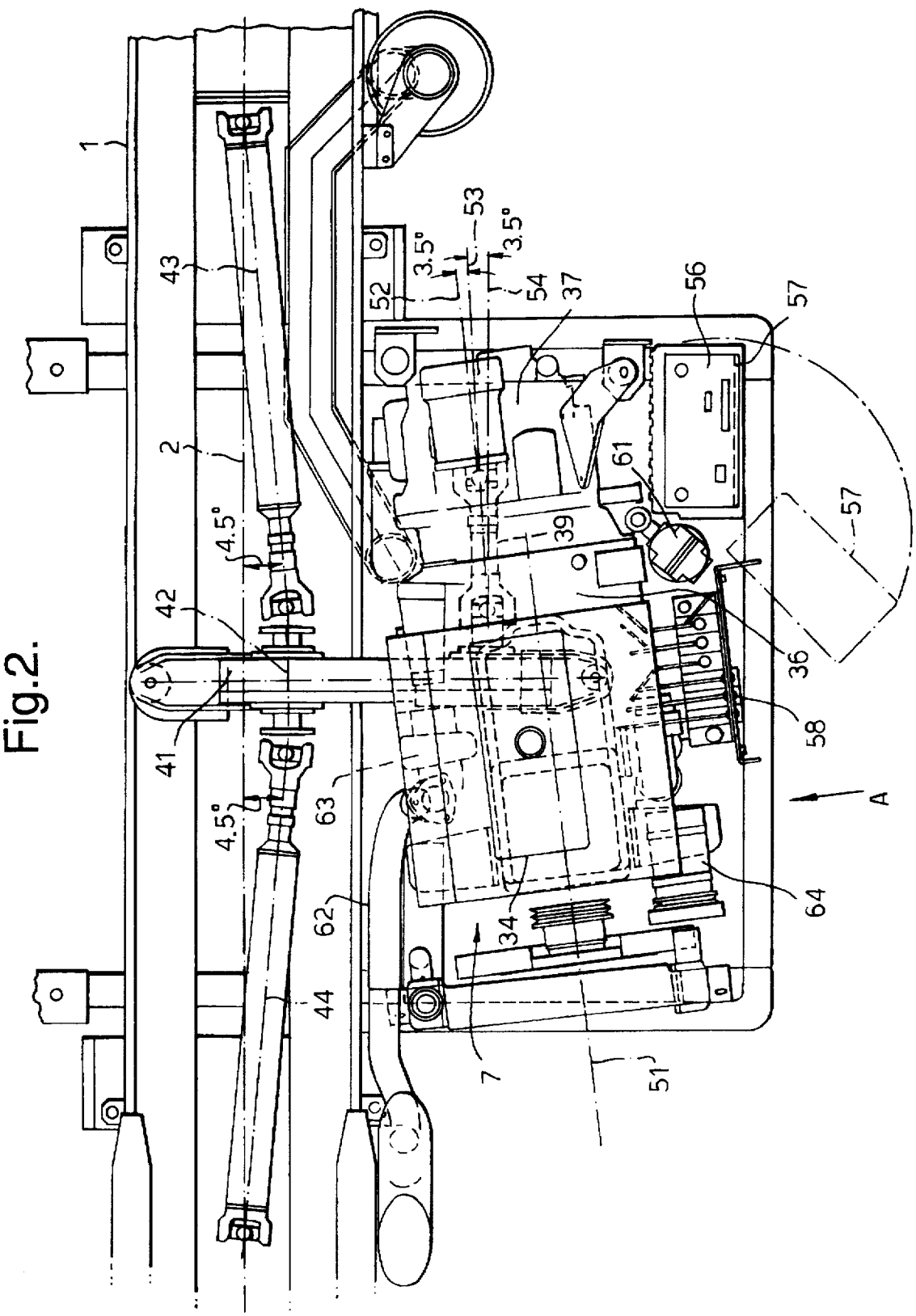
FIG. 2 is a diagrammatic plan view showing the layout of the engine/transmission arrangement in relation to the chassis of the machine.

As can be seen from FIG. 2, the output axis 52 of the gearbox 37 is displaced with respect to the vertical plane of the crankshaft axis 51, towards the longitudinal median plane 2. The angle between the gearbox output axis 52 and the Cardan shaft (39) axis 53 and the angle between the said axis 53 and the input axis 54 of the transfer box 41 are substantially equal, being about 3.5° (i.e. half of 7°).

The angle between the respective drive shaft axes 43, 44 and the transfer box (41) output axis 42 (as well as the input axes of the final drive units) is about 4.5°. This angle could be reduced further by extending the transfer box 41 and/or increasing the inclination of the engine shaft 51 and/or increasing the inward displacement of the gearbox output axis 52.

Thus inclining the engine 34 brings the advantage that the drive line angles can be kept below 5°, thereby reducing wear of the Cardan joints. Another advantage is that the center of gravity of the engine block is moved nearer to the longitudinal median plane 2, thereby enhancing the stability of the machine. Furthermore, the inclined arrangement makes more space available under the engine cover 33. In particular, the battery 56 can be fitted near the gearbox 37, where there is sufficient space above the battery 56 for a removable auxiliary battery 57, which may be necessary for starting in a cold climate. The hydraulic valve assembly 58 is placed in the middle of the engine compartment where the hydraulic pipe layout is simplified owing to the space available under the engine sump 59. Between the battery 56 and the hydraulic valve assembly 58 there is room for a long hydraulic filter 61, providing for extended service intervals, since the filter does not need to be changed frequently. There remains adequate space for the exhaust pipe 62 and turbocharger 63 of the engine. Finally, an air conditioner compressor 64 can be arranged outside the engine sump 59, behind the hydraulic valve assembly 58.

INDUSTRIAL APPLICABILITY

With reference to the drawings, and the previous detailed description, the subject material handling machine is particularly useful loading various types of materials and also for digging holes and trenches. Several advantages are achieved by mounting the engine 34 to the side of and at an angle to the longitudinal frame 1. These include keeping the angles of the drive line below about 5°, which reduces the wear of the Cardan joints. Also, the center of gravity of the engine block is moved nearer to the longitudinal median plane 2, thereby enhancing the stability of the machine. Additionally, the inclined arrangement provides more space under the engine cover 33 so other components can e located in that space, such as the battery 57 and a filter 61.

Various modifications can be made within the scope of the invention. For example, the entire arrangement shown in FIGS. 2 and 3 could be reversed from front to back, so that the engine shaft axis inclines towards the longitudinal median plane in the rearward direction rather than the forward direction. The angle of inclination may be more or less than the presently preferred value of 7°. A practically preferred minimum is 5° and a practically preferred maximum is 10°, although an inclination as high as 15° may be feasible and advantageous, depending on the engine design.

Other aspects, objects and advantages of this invention can be obtained from a study of the drawings, the disclosure and the appended claims.

I claim:

1. A material handling machine comprising:
 (a) a chassis including a rigid longitudinal frame (1);
 (b) an operator's cab (8) mounted on the chassis;
 (c) material handling means (21) mounted on the chassis;
 (d) a front axle and a rear axle mounted on the chassis;
 (e) wheels (13, 14) mounted on the axles;
 (f) a drive arrangement (7) mounted on the chassis, at one side of the longitudinal frame (1), between the front and rear axles, the drive arrangement (7) including an engine (34) having an engine shaft, and a mechanically driven transmission (37, 39, 41) kinematically connected to the engine shaft and having a power output (42) which is substantially mid-way along the length of the drive arrangement and which is displaced towards a vertical longitudinal median plane (2) of the longitudinal frame (1);
 (g) final drive units (18, 19) on the respective front and rear axles, for driving the wheels (13, 14);
 (h) drive shafts kinematically connecting the power output (42) to the final drive units (18, 19); and
 (i) the rotary axis of the engine shaft positioned in a vertical plane which is inclined relative to the vertical longitudinal median plane (2) of the longitudinal frame (1) with the end of the engine shaft which is connected to the transmission being nearer to the longitudinal frame (1) than is the other end.

2. A machine as claimed in claim 1, in which the power output (42) of the drive arrangement (7) is directly below the longitudinal frame (1).

3. A machine as claimed in claim 1, in which the power output (42) is substantially mid-way between the front and rear axles.

4. A machine as claimed in claim 1, in which the width of the longitudinal frame 1 is less than 25% of the overall width of the machine, excluding the wheels (13, 14).

5. A machine as claimed in claim 3, in which the cab (8) is mounted at the opposite side of the longitudinal frame (1) with respect to the drive arrangement (7).

6. A machine as claimed in claim 3, in which the material handling means (21) includes a boom (21) extending forwards above the longitudinal frame (1) from a pivotal mounting (22) on the chassis.

7. A machine as claimed in claim 1, in which the transmission (37, 39, 41) includes a gearbox (37) and a transfer box (41), said gearbox (37) having an input in line with the engine shaft and having an output (42) which is at a lower level and which is kinematically connected to the transfer box (41) substantially mid-way along the length of the drive arrangement (7), the transfer box (41) having the said power output (42).

8. A machine as claimed in claim 7, in which the output (42) of the transfer box (41) is displaced with respect to the engine shaft axis vertical plane towards the vertical longitudinal median plane 1).

9. A machine as claimed in claim 8, in which the angle between the engine shaft axis vertical plane and the vertical longitudinal median plane (2) is at least 5°.

10. A machine as claimed in claim 9, in which the said angle is not more than 15°.

11. A machine as claimed in claim 9, in which the said angle is not more than 10°.

12. A machine as claimed in claim 9, in which the said angle is about 7°.

13. A machine as claimed in claim 8, in which the drive shafts are at an angle of less than 5° to the axis of the power output (42) of the transmission.

14. A machine as claimed in claim 1, including two batteries (56, 57) arranged one above the other on the outboard side of the transmission.

* * * * *